(12) United States Patent
Wu (10) Patent No.: US 7,353,227 B2
(45) Date of Patent: Apr. 1, 2008

(54) CONFLICT RESOLUTION ENGINE

(75) Inventor: Yuh-Cherng Wu, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 389 days.

(21) Appl. No.: 10/897,821

(22) Filed: Jul. 23, 2004

(65) Prior Publication Data

US 2006/0020570 A1  Jan. 26, 2006

(51) Int. Cl.
*G06F 7/00* (2006.01)
(52) U.S. Cl. ............................... 707/8; 707/10
(58) Field of Classification Search .......... 707/1–10, 707/100, 104.1
See application file for complete search history.

(56) References Cited

U.S. PATENT DOCUMENTS

| | | | | |
|---|---|---|---|---|
| 5,581,754 | A | 12/1996 | Terry et al. | 707/8 |
| 5,696,966 | A | 12/1997 | Velarde | 707/10 |
| 5,806,074 | A | 9/1998 | Souder et al. | 707/201 |
| 5,860,070 | A * | 1/1999 | Tow et al. | 707/8 |
| 6,748,381 | B1 | 6/2004 | Chao et al. | 707/10 |
| 2002/0072928 | A1 | 6/2002 | Sundararajan | 705/1 |
| 2002/0138483 | A1* | 9/2002 | Bretl et al. | 707/8 |
| 2003/0182319 | A1 | 9/2003 | Morrison | 707/200 |
| 2004/0187152 | A1* | 9/2004 | Francis et al. | 725/58 |
| 2004/0230676 | A1* | 11/2004 | Spivack et al. | 709/223 |
| 2004/0236640 | A1* | 11/2004 | Kassan | 705/27 |
| 2005/0149609 | A1* | 7/2005 | Lamport | 709/200 |
| 2005/0283373 | A1* | 12/2005 | Lamport et al. | 705/1 |

OTHER PUBLICATIONS

Microsoft Computer Dictionary, Microsoft Press, 5th edition, 2002, p. 546.*
Lam et al. "Resolving Executing-Committing Conflicts in Distributed Real-Time Database Systems," *The Computer Journal*, 1999, vol. 42, No. 8, pp. 674-692.
http://www.mobilepipline.com/showArticle.jhtml?articleID=18200355—"Mobilizing Database-Driven Applications" Feb. 11, 2004, 6 pages.

* cited by examiner

*Primary Examiner*—Wilson Lee
(74) *Attorney, Agent, or Firm*—Fish & Richardson P.C.

(57) ABSTRACT

Various implementations provide techniques for resolving a conflict in a distributed computing environment. One implementation provides for receiving first and second alteration requests that specify first and second proposed alterations, respectively, to information stored in a database, where the first and second proposed alterations are inconsistent with one another. The first and second alteration requests are analyzed, and a conflict including an inconsistency between the first and second proposed alterations is identified. A request to alter the database that specifies either the first proposed alteration or the second proposed alteration is generated.

20 Claims, 5 Drawing Sheets

CONFLICT RESOLUTION ENGINE

TECHNICAL FIELD

This description relates to altering information that is stored in a database, and more particularly to resolving conflicts when proposed alterations to information stored in the database include an inconsistency.

BACKGROUND

In an enterprise system, a host server may communicate with various mobile devices. Mobile devices such as laptop computers, personal digital assistants (PDA's), or cellular telephones may be used to communicate with a host server and may access information that is stored on the host server. In this manner, users of the mobile devices can obtain information stored in a central repository on the host server for use in the field.

Similarly, users of mobile devices may provide input that is routed to the host server, for example corresponding to information to be stored in the central repository on the host server. Because the host server may receive database change requests from a number of different users of various mobile devices, each of whom may be unaware of other requests, the host server may receive change requests that conflict in some manner. For instance, two different users of mobile devices may request that the host server alter a document stored in a database on the host server. A first user may request that a portion of the document's text be deleted, while a second user may request that the text be modified to correct existing spelling errors. One method of dealing with conflicting database change requests is to permit only one change at a time by granting a right of change to one user and locking all other users out of database entry. Another method of dealing with conflicting database change requests is to follow a "first-come, first-served" rule. Using this method, the first user's request would be honored, resulting in the deletion of the text from the document.

SUMMARY

Various implementations provide techniques for resolving a conflict in a distributed computing environment. One implementation provides for receiving first and second alteration requests that specify first and second proposed alterations, respectively, to information stored in a database, where the first and second proposed alterations are inconsistent with one another. The first and second alteration requests are analyzed, and a conflict including an inconsistency between the first and second proposed alterations is identified. A request to alter the database that specifies either the first proposed alteration or the second proposed alteration is generated.

Various implementations may provide certain advantages. For example, information stored in a database may be more efficiently updated because otherwise valid conflicting alteration requests can be analyzed and a proposal suggesting an appropriate database alteration request can be generated. This may save time and prevent errors by identifying conflicts and preventing conflicting database updates. Moreover, because an alteration request can nevertheless be implemented despite the identification of a conflict, performance may be improved, storage space may be conserved and down time may be minimized.

The details of one or more implementations are set forth in the accompanying drawings and the description below.

Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
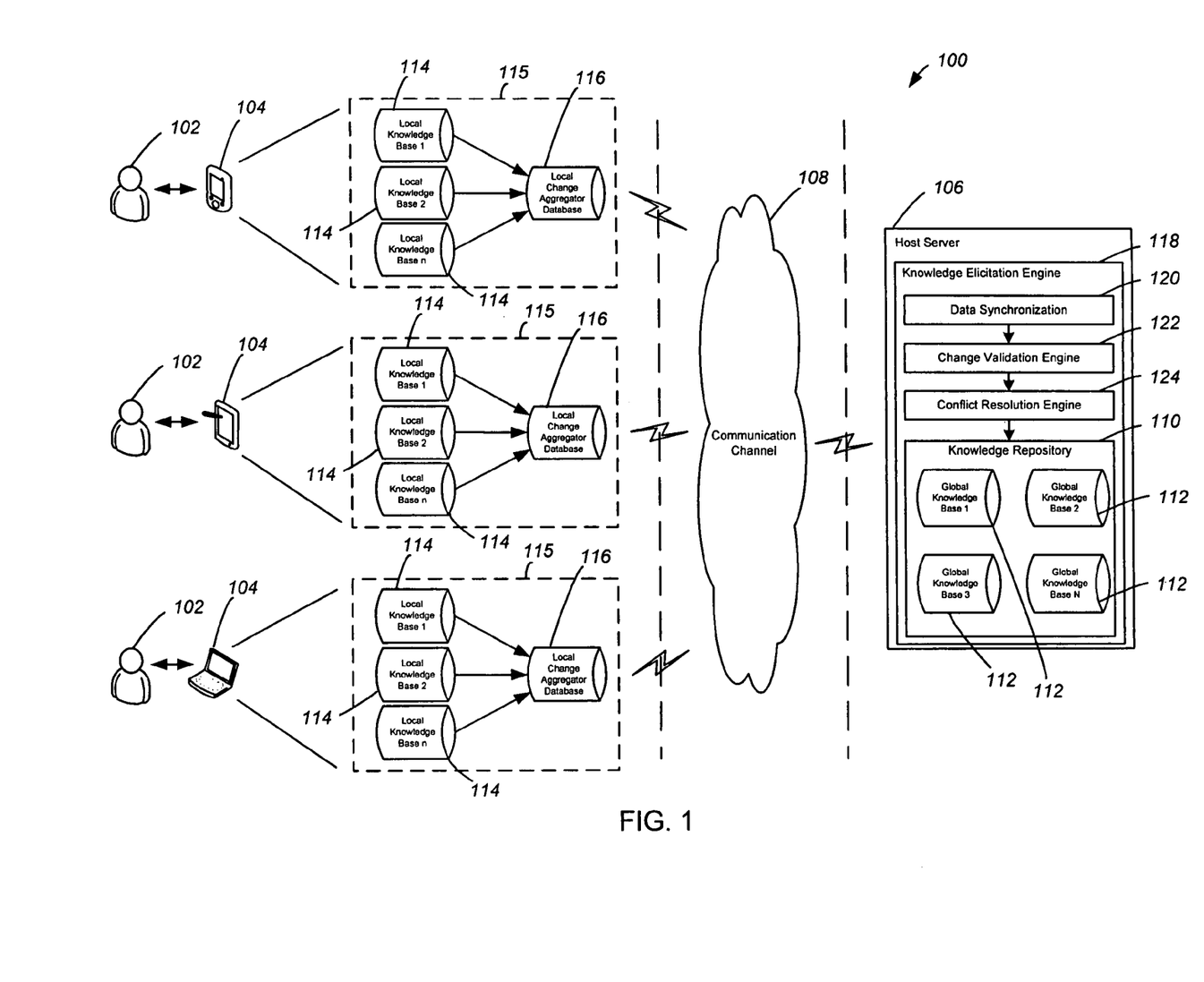
FIG. 1 is a diagram of a distributed knowledge system, according to one implementation.

Referring to FIG. 1, a knowledge system 100 is disclosed that provides a general framework for the migration, synchronization, and aggregation of stored data from multiple and distributed data sources. The system 100 may allow conflicts between suggested database alterations to be identified and resolved, and may permit appropriate alterations to information stored in a database. As illustrated in FIG. 1, this stored data may be accessed and utilized by one or more users 102 of the knowledge system 100. The users 102 may access, modify, or create data on their local devices 104. In one implementation, the local devices 104 may be portable computing devices such as laptop computers, personal digital assistants (PDAs), tablet PCs, or other devices that users may carry with them on field assignments. In other implementations, the local devices 104 may not be portable, but rather stationary computing devices such as dedicated workstations, desktop computers, or the like.

As shown in FIG. 1, the local devices 104 may communicate electronically with a host server 106 through a communication channel 108. The communication channel 108 provides an electronic link between the local devices 104 and the host server 106. A few examples of communication channels 108 include intranet local area network (LAN) connections, extranet wide area network (WAN) connections, and wired or wireless Internet connections. In some implementations, the communication channel 108 may provide a permanent link, such as a dedicated network connection, between the local devices 104 and the host server 106. In other implementations, the local devices 104 may be intermittently connected to the host server 106. For example, a user 102 may keep the local device 104 disconnected from the host server 106 except when uploading or downloading data.

As illustrated in FIG. 1, the host server 106 of a knowledge system 100 includes a knowledge repository 110 that provides a storage area for knowledge in the knowledge system 100. In one implementation, a knowledge repository 110 may be a file-based system that may store one or more global knowledge bases 112. In other implementations, the database management system may be used to store one or more global knowledge bases 112. Although only a single knowledge repository 110 is illustrated in FIG. 1, the system may be configured to support multiple knowledge repositories that may be distributed across multiple computer devices. Knowledge bases are one type of database, but other types of database entities may be used.

The global knowledge bases 112 may be provided to aggregate and store information for knowledge retrieval in the knowledge repository 110. Global knowledge bases 112 may include a collection of electronic documents such as electronic mail (e-mail messages), web pages, business documents, etc., that may be searched and organized for users 102. In some implementations, the global knowledge bases 112 may be organized as a collection of knowledge that may be expressed using various knowledge representation languages. These knowledge representation languages may include logic rules, production rules, semantic networks and frames. Although only four global knowledge bases 112 are illustrated in FIG. 1, a knowledge repository 110 may be configured to support one or more global knowledge bases 112.

The local devices 104 may store one or more local knowledge bases 114 in memory or disk within the local devices 104. This is illustrated in FIG. 1 by dashed boxes 115 that represent an exploded view of internal components within the corresponding local device 104. These local knowledge bases 114 may contain fully replicated versions of global knowledge bases 112, or they may contain some subset of the data from the global knowledge bases 112. Due to the extremely large storage space that may be required to store the entirety of data contained in a corporate knowledge system 100, it is often advantageous to allow such subsets of the data to be created on the local device 104 based on the types of information the user 102 may need to complete tasks that are generally within the user's field.

In one implementation, users 102 may be able to pick and choose the types of data they want to be stored on their local devices 104 while connected to the host server 106. In another implementation, the host server 106 may automatically provide information to the local devices 104 based upon a predetermined set of rules relating to the type of user, memory of the local device, geographic area, or other relevant data. Since the local knowledge bases 114 are physically stored in memory or on a disk in the local devices 104, the user 102 of a local device 104 may access the data in the local knowledge bases 114 even while disconnected from the host server 106. Alternatively, the local knowledge bases 114 may be stored on removable storage media (e.g., CD or DVD, Zip disk, or the like) or external storage devices, such as an external hard disk drive or pen drive.

The local knowledge bases 114 may also contain user-specific changes or alterations to information in the global knowledge bases 112. For example, while completing a task, a user 102 may find that a procedure contained in the local knowledge base 114 is incorrect or inefficient, and the user 102 may modify the procedure to correct the problem. In some implementations, after finding such a discrepancy between the "correct" method and the procedure stored in the global knowledge base 112, the user 102 may choose to either recommend an update to the information in the global knowledge base 112 or to merely make the change on the local device 104 in the local knowledge base 114. For example, the user 102 may determine that a certain procedure contains twelve different steps but realize that, in her experience, she can skip two of the steps and still attain a proper result in less time. In this example, the user 102 may propose a change to the global knowledge base 112 so that other users 102 will also be able to save time in completing the same task. In a different example, another user 102 may determine that he has a particular preference for completing a given task, but he knows that the other method works just as well and is already well documented. In that case, he may choose to make the change in his local knowledge base 114 but may not propose that a change be made to the global knowledge base 112.

As shown in FIG. 1, a local aggregator database 116 may be included in the local device 104 to store the aforementioned changes to the local knowledge bases 114 or proposed alterations to the global knowledge bases 112. In other implementations, the change information may be stored within the local knowledge bases 114 themselves. In such implementations, a local knowledge base 114 may allow flags or other electronic markers to be set to indicate that the change should be recognized or ignored when the local device 104 is connected to the host server 106 through the communication channel 108. In addition to data change information, the local aggregator database 116 or the local knowledge bases 114 may also contain data indicators for when a particular piece of knowledge is accessed or used on a local device 104, and may also allow the user 102 to rate a given piece of knowledge after using it, such that the quality or usefulness of that piece of knowledge is identified.

Figure 2:
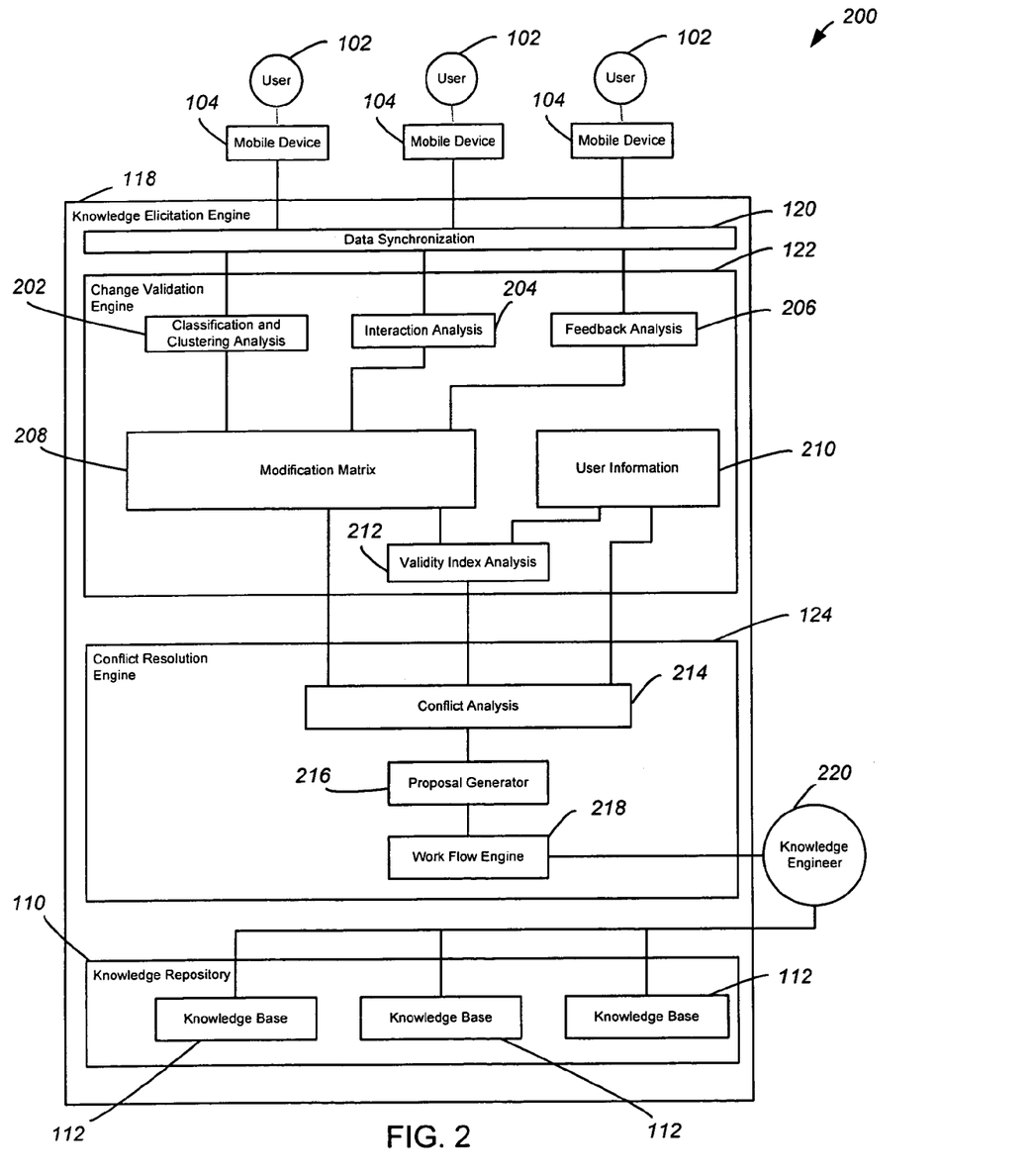
FIG. 2 is a block diagram of various components of the knowledge elicitation engine shown in FIG. 1, according to one implementation.

The host server 106 includes a knowledge elicitation engine 118 that includes a data synchronization module 120, a change validation engine 122 and a conflict resolution engine 124, each of which will be described further with reference to FIG. 2. FIG. 2 shows a system 200 that depicts the knowledge elicitation engine 118 of FIG. 1 in greater detail. The system 200 shows the users 102 with mobile devices 104 connected (over communication channel 108, for instance) to the knowledge elicitation engine 118 of a host server 106. As previously described, the knowledge elicitation engine 118 includes the data synchronization module 120, change validation engine 122, conflict resolution engine 124, and the knowledge repository 110, which includes several knowledge bases 112.

Typically, an individual knowledge base 112 or 114 contains a specific type of information. For example, a knowledge base 112 or 114 may contain product, customer, service history, contract, or procedural information. If a user 102 is a field engineer or a service technician, the user 102 may use a mobile device 104 that houses local knowledge bases 114 (FIG. 1) including a product knowledge base, a customer knowledge base, a service history knowledge base, or the like, and the host server 106 may have global knowledge bases 112 that store similarly categorized information.

Within each of the knowledge bases 112, 114, a number of knowledge entities may be stored. Knowledge entities may comprise electronic documents such as specific work orders, service history forms, customer profiles, or the like. Any given knowledge entity may have several types of records associated with it including change records, interaction records, and/or feedback records. When traveling or meeting with customers, a user 102 may use the mobile device 104 to access information residing either in a local knowledge base 114 or a global knowledge base 112. The user 102 may wish to make a change to information stored in a global knowledge base 112, and may create an alteration request that suggests modifying or deleting information currently stored in the global knowledge base 112, or adding new information to the global knowledge base 112. This request may comprise a change record within a knowledge entity.

Change records may include substantive information describing the proposed change, such as details about an addition, modification, or deletion of certain attributes, text or other information contained in the knowledge entity. Change records may further include certain metadata describing information about the context of the proposed change, such as which user 102 suggested the proposed change, which device 104 the proposed change originated from, or what type of task the user 102 was performing when the change was originated. Interaction records may be associated with a given knowledge entity and may include information about how each knowledge entity has been used by various users 102 in the field.

Referring again to FIG. 2, the data synchronization module 120 processes the alteration requests that are received from the various devices 104. For example, the data synchronization module 120 may asynchronously accept alteration requests and data updates from mobile devices 104 and store the information until some condition has been met. The data synchronization module 120 may use a set of configurable rules to determine when and how incoming information is to be processed by the host server 106. These rules may specify that the host server 106 will process alteration requests at specific time intervals, such as every twenty-four hours, every twelve hours, every six hours, every hour, or every half hour by referencing a clock running on the host server 106. When an appropriate time interval has expired, the data synchronization module 120 may check for incoming alteration requests, and provide such information to the change validation engine 122. In other implementations, the condition may be a size limitation such that the data synchronization module 120 stores updates until a predefined number of requests or a threshold level of information has been received. In yet another implementation, the data synchronization module 120 may merely provide a pass-through interface to the change validation engine 122, thus allowing for nearly asynchronous processing of incoming requests.

The change validation engine 122 uses a set of configurable rules to determine whether or not an individual alteration request should be submitted to the knowledge repository 110, independent of considerations concerning other pending alteration requests. As information is received by the change validation engine 122, it may be categorized and routed to one of three modules: information about a requested change may be routed to a classification and clustering analysis module 202; information about how a piece of knowledge has been previously used may be routed to an interaction analysis module 204; and information concerning the quality or usefulness of a piece of knowledge may be routed to a feedback analysis module 206. The classification and clustering analysis module 202 may organize one or more alteration requests pertaining to a particular knowledge entity, for example, into a cluster of information. Each piece of knowledge may include data from any one or any combination of the three categories, and the change validation engine 122 may use this information to make a determination on the requested alteration's validity. The data may be user-entered or automatically generated without user intervention.

As shown in FIG. 2, the output of the various analysis components 202, 204, 206 may then be grouped together by a modification matrix module 208, and output as a collection of data in a modification matrix. This modification matrix may contain all of the related information associated with any given singular knowledge entity or a set of knowledge entities. For example, if only a single knowledge entity is involved, the modification matrix may include information concerning the specific change requested, information detailing the number of times that the knowledge entity had been used by each of the users 102 in the field, and information comprising feedback received about the knowledge entity. In a more complicated example, the matrix may include several different change requests for a single knowledge entity, with the matrix similarly including information about the entity's feedback and usage, as before. In yet another and more complex example, the matrix may include information concerning requested changes to several different knowledge entities from multiple users 102 and also include the associated feedback and usage information for each of the different knowledge entities.

Also illustrated in FIG. 2 is a user information module 210 that generates data on a particular user, based on a user proposing a given change to a specific knowledge entity. This information, combined with information from the modification matrix module 208, serves as an input to a validity index analysis module 212. The validity index analysis module 212 calculates a validity index value for each alteration request. The validity index value is used to represent the desirability, from a system-level perspective, of the corresponding alteration request.

The calculated validity index value may then be compared to a configurable validity threshold value to determine whether or not the alteration request will be forwarded to the conflict resolution engine 124. For example, the validity index analysis module 212 may consider information pertaining to the specific change requested, information detailing the number of times that the knowledge entity has been used by each of the users 102 in the field, information comprising feedback received about the knowledge entity, or information about the user requesting the change, and then use a configurable rule to calculate an appropriate validity index value for the proposed change to a knowledge entity. If this validity index value exceeds the validity threshold value, which may be set by a user, supervisor, administrator or the like, the alteration request may be validated and forwarded to the conflict resolution engine 124. Alteration requests having validity index values that fail to exceed the validity threshold value may be returned to the modification matrix module 208, for example, such that they may be re-evaluated at later time.

The conflict resolution engine 124 contains a conflict analysis module 214, a proposal generation module 216, and a work flow engine 218. The conflict analysis module 214 may receive validated alteration requests and associated information from the change validation engine 122, and may determine whether conflicts exist among the validated alteration requests. For example, in addition to the change records of each alteration request, the conflict analysis module may also receive the interaction records and feedback records, appropriate user information, as well as the corresponding validation index value calculated for the alteration request. This data may be delivered to the conflict resolution engine 124 in the form of a single alteration request, as a cluster of one or more alteration requests pertaining to the same knowledge entity, or as a cluster containing one or more alteration requests pertaining to more than one knowledge entity. The operation of the conflict analysis module 214 will be further described below with reference to FIGS. 3-4.

Based on output from the conflict analysis module 214, the proposal generation module 216 generates a proposal of suggested knowledge base alterations. The proposal is passed to the work flow engine 218, which may generate a visual presentation of the proposal for a knowledge engineer 220, who may be a human operator with final discretion as to whether the proposal is implemented. The visual presentation may include a representation of the proposed database changes, alternative options, a representation of relevant conflicts, as well as any of the information received by the conflict resolution engine 124 from the change validation engine 122, and may be presented on a video monitor for the knowledge engineer's review, for example. Alternatively, the knowledge engineer 220 may be replaced by an automated process that determines whether to implement the proposal without human intervention. In other implementations, the knowledge engineer 220 and the work flow engine 218 are not required and the proposal from the proposal generation module 216 may be directly implemented in the appropriate knowledge bases 112 of the knowledge repository 110.

Figure 3:
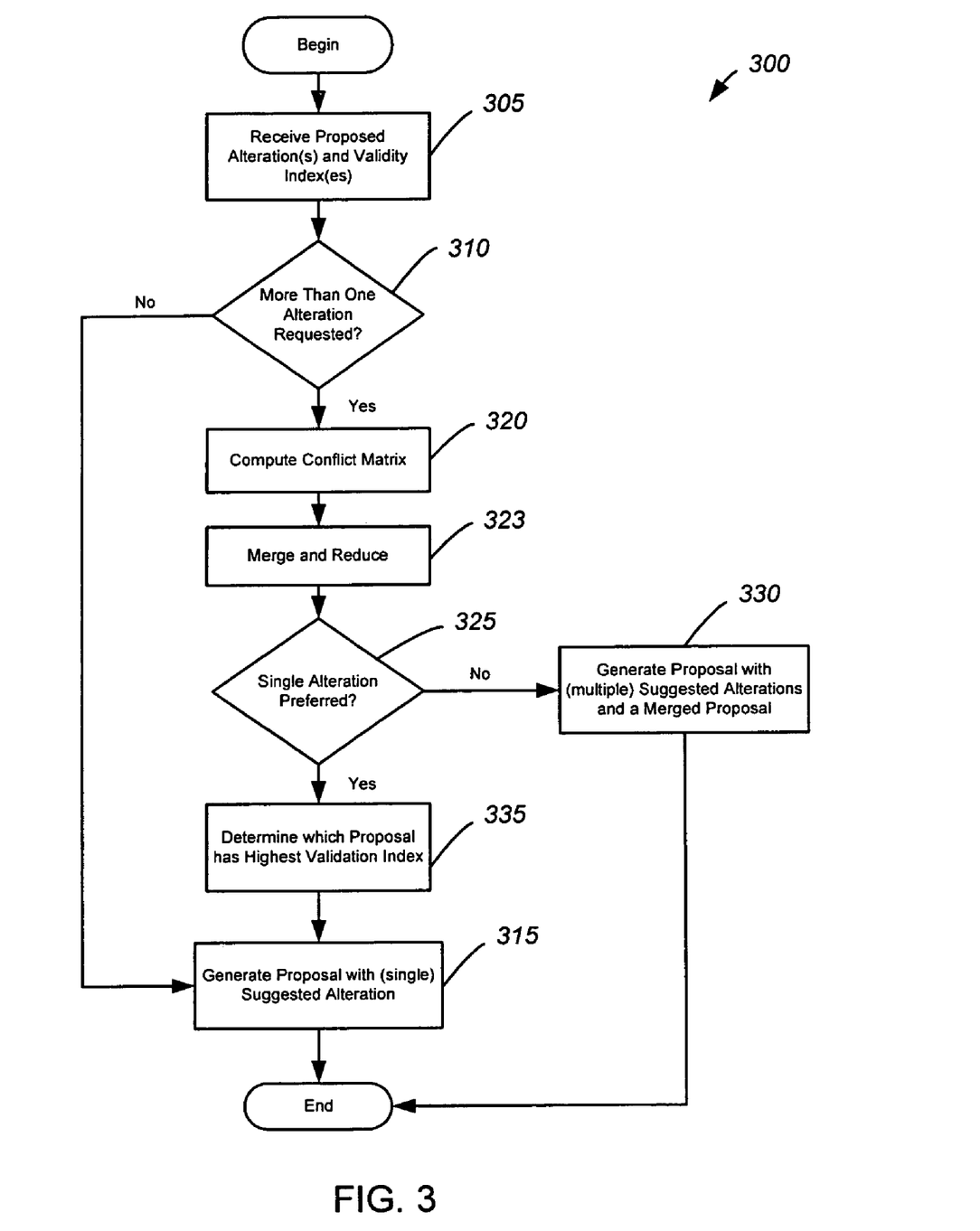
FIG. 3 is a flow diagram illustrating an operation of a conflict resolution engine application, according to one implementation.

Referring now to the flowchart of FIG. 3, a process 300 performed by a processor executing instructions from a conflict resolution application begins, at an action 305, with the receipt of a proposed alteration request or requests and associated validity index value(s). For example, the modification matrix module 208, user information module 210 or validity index analysis module 212 may provide this information to the conflict analysis module 214. The alteration requests may have been originated by users 102, and may have been validated and assigned the associated validity index values by the change validation engine 122 shown in FIG. 2. A request having a higher corresponding validity index value may indicate that the request is a higher priority for implementation than a request with a lower corresponding validity index value. Because the requests are received from the change validation engine 122 and the requests have been independently validated, the requests should be implemented in the absence of a conflict. Next, if only a single alteration is requested at a checkpoint 310, a proposal requesting the suggested change may be generated at an action 315 and the process 300 ends. In this case, further conflict analysis may be unnecessary because a single validated alteration request may pose no threat of conflict with other pending alteration requests.

If, however, more than one alteration request is received at checkpoint 310, conflict analysis is performed at actions 320 and 323 by the conflict analysis module 214. A conflict matrix can be constructed at action 320 by computing a conflict index value for each pair of alteration requests. A method for computing the conflict index value will be more fully described below with reference to FIG. 4. The conflict matrix can be used to resolve conflicts by a set of rules to reduce or merge the requests at action 323. For example, a rule may remove from consideration a request that has a relatively low validation index value and a relatively high conflict index value when compared to other requests. Similarly, a rule may merge a request having a low validation index value with a request that has a high validation index value and is conflict free. Another rule may remove from consideration all requests that conflict with requests having higher corresponding validation index values. Alternatively, such requests with lower validation index values might only be removed if their validation index value falls a certain threshold distance below the validation index value of a conflicting request.

Another implementation may sort the conflict matrix, creating a sequence of requests based on the corresponding validation index value, and secondarily according to conflict index value. The sequence may then be examined to remove requests that have a low validation index value and conflict with a request having a high validation index value, and may merge two requests that have low conflict index values and comparable validation index values. The conflict matrix may be updated after each merge and/or reduction.

In another implementation, an averaged pair-wise conflict index value may be computed for each request (for example, by computing a conflict index value for the request against all other pending requests and calculating an average value) and a decision matrix can be constructed. One example considers two conflict index levels (high and low) and two validation index levels (high and low). Configurable thresholds may be assigned to facilitate classification of the conflict and validation index levels as high or low, for instance. The table below shows four resulting scenarios that may occur.

| Actions | Low Conflict Index | High Conflict Index |
| --- | --- | --- |
| Low Validation Index | Additional Rules | Remove |
| High Validation Index | Merge | Additional Rules |

For example, an alteration request that has a low validation index value and a high conflict index value may be removed from consideration, while a request with a high validation index value and low conflict index value may be merged with other requests for recommendation in a proposal for implementation. Additional rules may specify whether to merge, remove, or take some other action for requests having both a low validation index value and a low conflict index value, or both a high validation index value and a high conflict index value. Relevant considerations may include the amount of overlap between requests, the similarity of the requests, the spread between validation index values, as well as user information, feedback information, and interactive information. Rules may also vary depending upon whether the system installation includes a knowledge engineer 220. For example, in installations that do not include a knowledge engineer 220, the rules may automatically remove from consideration requests that have low validation index values when they conflict with other alteration requests, but may instead propose multiple conflict alternatives when a knowledge engineer 220 is included as part of an installation to permit the knowledge engineer 220 to review the conflicts, select among the proposed alternatives, or otherwise resolve the conflicts.

Referring again to FIG. 3, if a given installation is configured to prefer multiple (as opposed to single) alterations at a checkpoint 325, requests that survive the merge and reduction action 323 may be included in a proposal that may be generated at an action 330 and the process 300 ends. This may occur, for example, when the alteration requests are identical, or when they may each be implemented without adversely affecting the other in the case of differing change requests. If, instead, the installation is configured such that single alteration requests are preferred at checkpoint 325, the corresponding validation index values for the surviving requests may be compared at an action 335 and a proposal may be generated at action 315 that recommends implementing the request with the higher corresponding validity index value, and the process 300 ends. User information such as the experience level of the user 102 requesting the change, or feedback or interaction information on the knowledge entity can be used to determine which of a conflicting set of alteration requests to include in the proposal. Alteration requests not recommended for implementation may be returned to the modification matrix module 208, for example, or may be presented as alternative proposals to the knowledge engineer 220 shown in FIG. 2.

Figure 4:
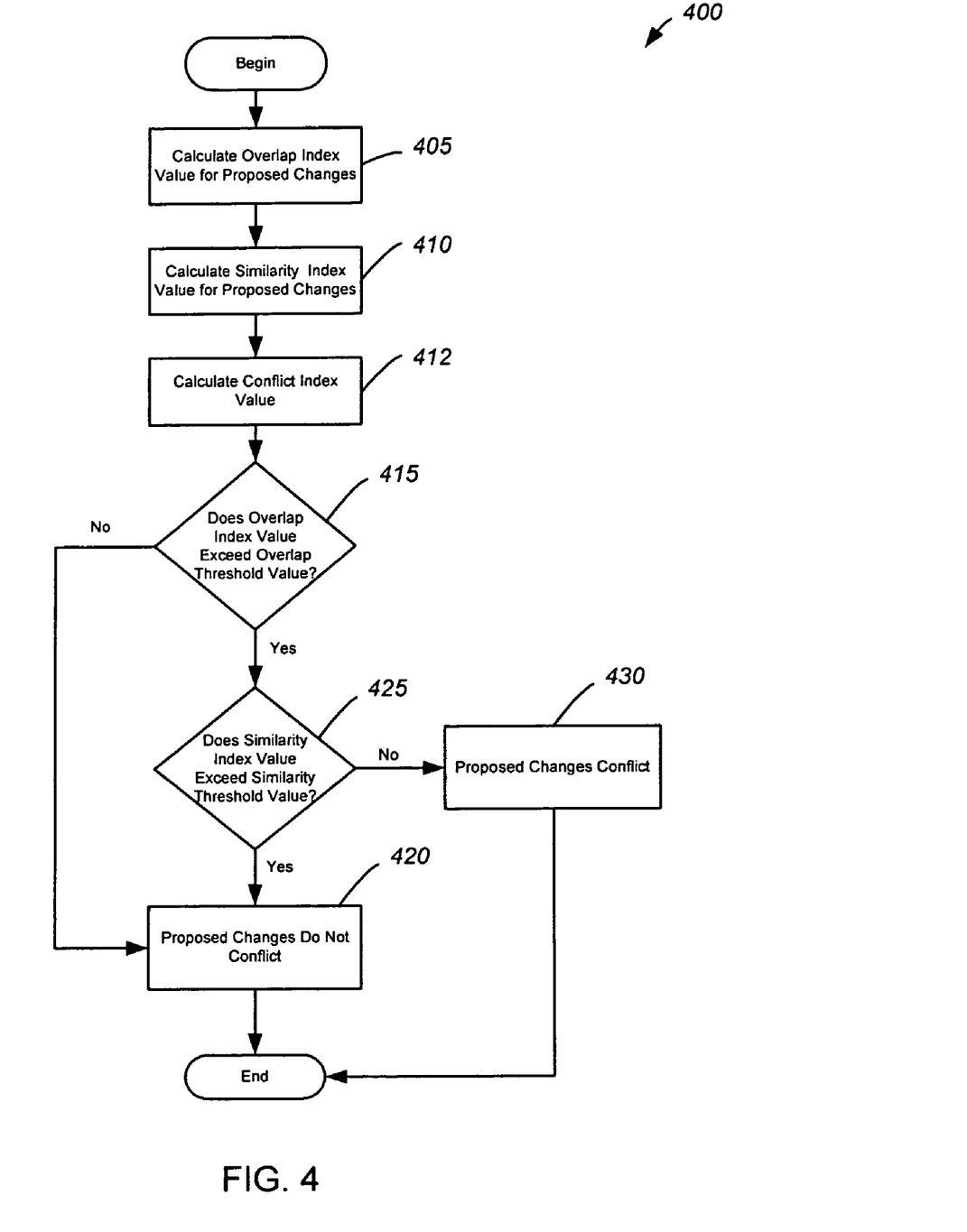
FIG. 4 is a flow diagram illustrating an operation of the conflict analysis module shown in FIG. 3, according to one implementation.

Referring now to the flowchart of FIG. 4, a process 400 performed by a processor executing instructions from a conflict analysis application begins, at an action 405, with the calculation of an overlap index value for a group of proposed changes. The calculated overlap index value may be based on the amount of overlap between the proposed changes. For example, two alteration requests that each attempt to modify, add or delete textual information from the same line of a document may be assigned an overlap index value of 1.0, while requests that attempt to alter different lines may be assigned an overlap index value of 0.0. In another implementation, requests that attempt to change different words or characters in the same line of text may be assigned an overlap index value of 0.5, those attempting to change the same words or characters in the same line may be assigned an overlap index value of 1.0, and those attempting to change some (but not all) of the same words or characters within the same line may be assigned an overlap index value between 0.5 and 1.0, depending on the number of words or characters in common.

Next, at an action 410, a similarity index value is calculated for the proposed changes. In one implementation, if two requests both suggest the same action from the list of add, delete or modify actions, they may be deemed to have a similarity index value of 1.0, and otherwise 0.0 if they suggest different actions. In other implementations, merely taking the same action may warrant a similarity index value of 0.5, while taking the same action on the same data in the same way may warrant a similarity index value of 1.0, with variations possible depending upon how similar the actions are.

Next, a conflict index value may be computed at an action 412. The conflict index value can be computed from the overlap index value (calculated at action 405), similarity index value (calculated at action 410) and/or additional configurable rules. In one implementation, a mathematical formula can be used to describe the combined value so that the conflict index value is lower for a combination of a low similarity index value and a low overlap index value, or a combination of a high similarity index value and a high overlap index value. In another implementation, a two-dimensional grid can be constructed with similarity index values on a first axis and overlap index values on a second axis, and a point can be plotted on the grid for each request. Different areas on the grid can then be specified to represent different levels of confliction. In another implementation, a natural language processing module can be integrated to interpret the meaning of the conflicting requests to provide additional input for a determination of the conflict index value. The complexity of the mechanisms for computing the conflict index value can vary significantly depending on the desired level of accuracy for interpreting conflicts.

At a checkpoint 415, the calculated overlap index value is compared to a threshold overlap value, and if the calculated value does not exceed the threshold value (that is, the changes do not sufficiently overlap), then the proposed changes do not conflict (action 420) and the process 400 ends. If the overlap index value does exceed the threshold overlap value at checkpoint 415, indicating that the changes correspond to overlapping data within the corresponding knowledge entity, then the calculated similarity index value is compared to a threshold similarity value at a checkpoint 425. If the calculated similarity value exceeds the threshold similarity value, then the changes do not conflict (action 420) because they are sufficiently similar and the process 400 ends. If, however, the similarity index value does not exceed the similarity threshold value, then the proposed changes conflict (action 430) and the process 400 ends. Threshold values may be set by users, supervisors, administrators or knowledge engineers, for example. In an alternative implementation, similarity analysis is omitted and a conflict is detected whenever proposed changes overlap. This may provide a simpler algorithm for implementation, for example.

In one example, a first user 102 may request a change to a knowledge entity. The first user 102 may be a field service technician, and the knowledge entity may be a document such as a service history form that is used by many of the technicians employed by the first user's employer. Suppose that the first user 102 notices an error in a telephone number located within a three-line section of text in the service history form, and accordingly enters a first alteration request to change a "3" to a "5" in the phone number, which happens to be on the third line of the section of text. Similarly, second user 102 may notice the same error and enter a second alteration request corresponding to the same proposed change.

Considering now the conflict analysis process 400, because both the first and second alteration requests modify textual data within the same line (here, the same character as well), an overlap index value of 1.0 may be assigned at action 405. Similarly, because each alteration request suggests modifying text (here, each request proposing changing the "3" to a "5"), a similarity index value of 1.0 may be assigned at action 410. Because this example features alteration requests having a high overlap and high similarity, a relatively low conflict index value, such as 0.0, 0.1, 0.2, or 0.3, for example, may be computed at action 412. Suppose now that an administrator or a knowledge engineer 220 had selected both an overlap threshold value and a similarity threshold value of 0.6. Then, in this example, the calculated overlap value of 1.0 would exceed the threshold overlap value of 0.6 at checkpoint 415, and the calculated similarity value of 1.0 would exceed the similarity threshold value of 0.6 at checkpoint 425, and the identical first and second alteration requests would be determined not to conflict at action 420. A proposal suggesting the alterations could then be generated at action 330, shown in FIG. 3. Here, because the proposed alterations are identical, it effectively makes no difference whether the configuration prefers single or multiple alteration requests per proposal at checkpoint 325; either way, the knowledge base will be altered in the same way. Note that in an implementation where similarity analysis was omitted, a conflict would likely be detected because of the calculated overlap index value of 1.0, despite the fact that the requests are identical. This example shows the advantages of using checkpoints 415 and 425 because appropriate alterations may be identified and implemented.

As a second example, a first user 102 may wish to make an addition to the third line of the service history document, perhaps by adding an e-mail address after the telephone number, and may accordingly submit a first alteration request. Suppose now that a second user 102 wishes to delete text from the first line of the service history document, perhaps wishing to delete one or more words that are no longer necessary, and submits a second alteration request to this effect. Assume threshold values of 0.6, as before. In this example, an overlap index value of 0.0 may be calculated at action 405 because the changes apply to different lines of the text. A similarity index value of 0.0 may be calculated at action 410 because the first request suggests an addition while the second request suggests a deletion. Because this example features alteration requests having both low overlap and low similarity, a low conflict index value, such as 0.0 for example, may be computed at action 412. Because the calculated overlap index value of 0.0 does not exceed the threshold overlap value of 0.6, the proposed changes do not conflict at action 420 and a proposal that includes both the first and the second alteration requests may be generated (action 330, FIG. 3), assuming multiple alteration requests are acceptable. In this example, the same result would be reached with an implementation that omitted similarity analysis. In addition, a determination of whether or not the configuration prefers single alteration requests per proposal at checkpoint 325 is important: if single alterations are preferred, only the request with the higher validation index will be proposed at action 335 and the other request may be returned to the modification matrix module 208 for further processing.

As a third example, consider a scenario similar to the first example above, but here assume that the first user 102 submits a first alteration request that suggests that the "3" be changed to a "4," while the second user's alteration request suggests that the "3" be changed to a "5," as in the first example. Here, an overlap index value of 1.0 may be calculated at action 405 because the changes apply to the same line of the text, and indeed the same character. A similarity index value of 0.5 may be generated at action 410 because while each request suggests a modification, they modify the character in different ways. Because this example features alteration requests having a high overlap and low similarity, a relatively high conflict index value, such as 0.7, 0.8, 0.9 or 1.0, for example, may be computed at action 412. Because the overlap index value of 1.0 exceeds the overlap threshold value of 0.6 at checkpoint 415 but the similarity index value of 0.5 fails to exceed the similarity threshold value of 0.6 at checkpoint 425, the proposed changes conflict (action 430). This will cause the respective validity index values to be compared at action 335 in FIG. 3 and a proposal containing the alteration request with the higher validity index value may be generated at action 315. Alternatively, the merge and reduce action 323 may remove one of the requests from consideration.

As a fourth example, consider a scenario where each user wishes to change the second line of text in the service history document: the first user wishes to add two words for clarification, while the second user wishes to delete one word that she considers extraneous. In this example, an overlap index value of 1.0 may be calculated at action 405 because the changes apply to the same line of the text, and a similarity index value of 0.0 may be calculated at action 410 because the actions differ (addition versus deletion). Here, the calculated overlap index value of 1.0 exceeds an overlap threshold value of 0.6 but the similarity index value of 0.0 does not exceed a similarity threshold value of 0.6 at checkpoints 415 and 425, respectively, so the changes do not conflict (action 420) and a proposal may be generated that suggests both alteration requests be implemented (action 330, FIG. 3). If similarity analysis is omitted, however, a different result may be reached. For instance, because an overlap is detected at checkpoint 415, the changes may be thought to conflict, and only the alteration request with the highest corresponding validity index value may be included in a proposal (actions 335, 315 in FIG. 3).

Alternatively, an implementation may recognize that although the actions were requested on the same line of text, they were nevertheless requested for different words or characters within the line, and accordingly may assign a lower overlap index value, such as 0.5. In this case, the calculated overlap index value of 0.5 would not exceed the overlap threshold value of 0.6 and the changes would not conflict (action 420), allowing for a proposal recommending both alteration requests. Similarly, the calculated conflict index value at action 412 may be either relatively low or relatively high, depending on the variations possible in overlap analysis or similarity analysis. For example, the implementation described above that calculates an overlap index of 1.0 will likely also calculate a higher conflict index value than the implementation in which the overlap index value was computed to be 0.5. Rule variations may also determine whether the choice of single alteration preference at checkpoint 325 results in different proposals. If single alterations are preferred, then only the request with the higher corresponding validation index value will be proposed at action 325. If not, then both requests may be proposed at action 330, depending on similarity and overlap analysis.

Figure 5:
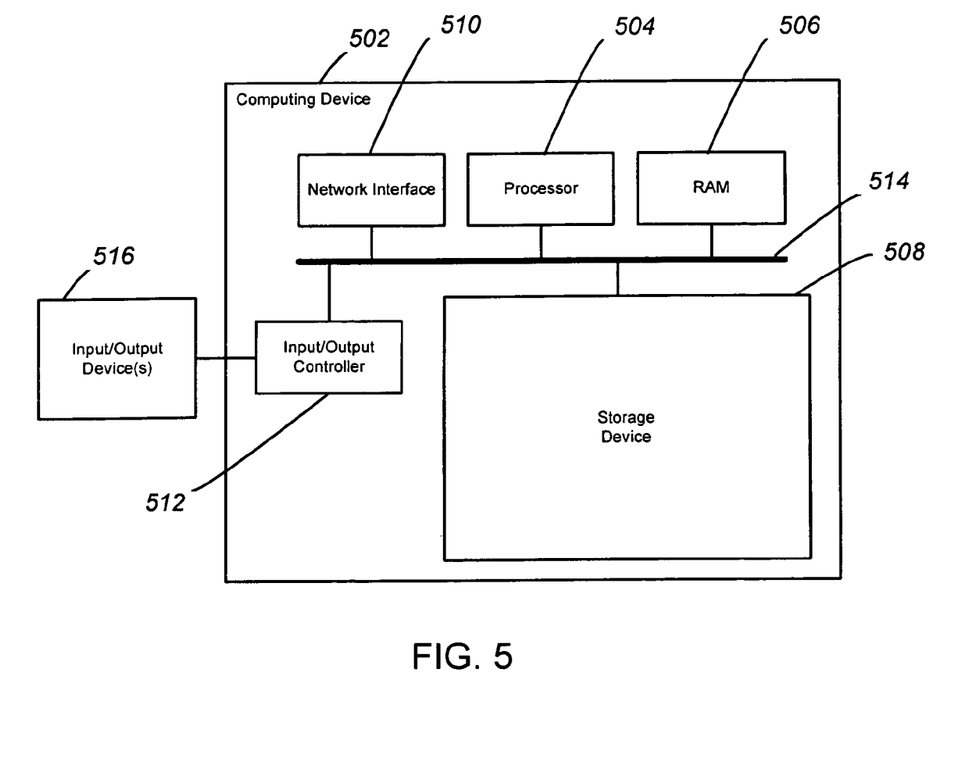
FIG. 5 is a block diagram of a computing device that may be incorporated within the local devices or host server shown in FIG. 1.

FIG. 5 is a diagram of a computing device 502 that may be included within the local devices 104 or the host server 106 shown in FIG. 1, according to one implementation. The computing device 502 includes a processor 504, a memory 506, a storage device 508, a network interface 510, and an input/output controller 512. Each of the components 504-512 are interconnected using a system bus 514.

The processor 504 is capable of processing instructions for execution within the computing device 502. In one implementation, the processor 504 is a single-threaded processor. The processor 504 is capable of processing instructions stored in the memory 506 or on the storage device 508 to display graphical information for a GUI on an input/output device 516 that is controlled by the input/output controller 512.

The memory 506 stores information within the computing device 502. In one implementation, the memory 506 is a computer-readable medium. In one implementation, the memory 506 is a volatile memory unit. In another implementation, the memory 506 is a non-volatile memory unit. The storage device 508 is capable of providing mass storage for the computing device 502. In one implementation, the storage device 508 is a computer-readable medium. In various different implementations, the storage device 508 may be a floppy disk device, a hard disk device, an optical disk device, or a tape device.

The network interface 510 is capable of connecting the computing device 502 to a network. In one implementation, the network interface 510 may require physical connection of the computing device 502 to a network connection. In other implementations, the network interface 510 may be capable of wireless network access.

In one implementation, a computer program product is tangibly embodied in an information carrier. The computer program product contains instructions that, when executed, perform one or more methods, such as those described above. The information carrier is a computer- or machine-readable medium, such as the memory 506, the storage device 508, or a propagated signal.

The input/output device 516 may provide input/output operations for the computing device 502. In one implementation, the input/output device 516 includes a keyboard and/or a pointing device. In one implementation, the input/output device 516 includes a display unit for displaying various GUI's such that a human operator may interact efficiently with the computing device 502.

A number of implementations have been described. Nevertheless, it will be understood that various modifications may be made without departing from the spirit and scope of the implementations. For example, alteration requests may suggest that attributes or values be altered. Examples might include addresses, names, quantities, dates and the like. Accordingly, other implementations are within the scope of the following claims.

What is claimed is:

1. A computer-implemented method of analyzing multiple different requests to alter an electronic knowledge repository and generating a proposed modification to the electronic knowledge repository, the method comprising:
   receiving first and second alteration requests, the first and second alteration requests originating from first and second users, respectively, and specifying first and second proposed alterations, respectively, to information stored in the electronic knowledge repository;
   assigning to each of the first and second alteration requests a validity index value that represents the desirability of the corresponding proposed alteration, each assigned validity index value being determined using data pertaining to the particular user from which the alteration request originated;
   analyzing the first and second alteration requests by computing a degree of inconsistency between the first and second proposed alterations, and determining if the degree of consistency exceeds a specified threshold;
   if the degree of inconsistency exceeds the specified threshold, generating a proposed knowledge repository modification request that includes only one of the first and second proposed alterations, the only one alteration being determined using the validity indexes associated with each of the first and second alteration requests; and
   forwarding the generated proposed modification request for further processing that determines if and how the knowledge repository is to be changed.

2. The method of claim 1, wherein computing the degree of inconsistency comprises computing an overlap index value based upon an overlap of the first and second proposed alterations, and determining if the degree of inconsistency exceeds the threshold comprises determining if the overlap index value exceeds a previously determined overhead threshold value.

3. The method of claim 1, wherein computing the degree of inconsistency comprises computing a similarity index value based upon a similarity of the first and second proposed alterations, and determining if the degree of inconsistency exceeds the threshold comprises determining if that the similarity index value fails to exceed a previously determined similarity threshold value.

4. The method of claim 1, wherein the proposed alterations are either additions, deletions or modifications.

5. The method of claim 1, wherein the processing of the proposed modification request includes providing a visual presentation of a proposal to a user, the proposal comprising an application of either the first proposed alteration or the second proposed alteration to the information stored in the knowledge repository, such that the user is capable of deciding whether or not to implement the proposal.

6. The method of claim 5, further comprising including in the proposal user information, feedback data, or interaction data pertaining to the first or second alteration request.

7. The method of claim 1, further comprising:
   comparing previously determined first and second validation index values for the first and second alteration requests, respectively; and
   proposing that the alteration request having the higher corresponding validation index value be implemented.

8. The method of claim 1, further comprising:
   receiving a third alteration request that specifies a third proposed alteration; and
   analyzing the third alteration request, and computing a degree of inconsistency between each pair among the first, second, and third proposed alterations.

9. The method of claim 1, further comprising implementing the proposed modification request and causing information in the knowledge repository to be altered as specified by the proposed modification request.

10. A computer-implemented method of analyzing proposed alterations to information in a database and generating a request to alter the database, the method comprising:
    receiving first and second alteration requests, the first and second alteration requests specifying first and second proposed alterations, respectively, to information stored in a database;
    analyzing the first and second alteration requests and determining whether or not a conflict exists between them;
    if a conflict exists between the first and second proposed alterations, generating a request to alter the database, the request specifying either the first proposed alteration or the second proposed alteration, wherein the conflict is resolved by removing the other of the first and second proposed alterations from consideration;
    if a conflict does not exist between the first and second proposed alterations, generating a request to alter the database, the request specifying the first proposed alteration and the second proposed alteration; and
    forwarding the generated request to alter the database for further processing that determines if and how the database is to be altered.

11. The method of claim 10, wherein analyzing the first and second alteration requests and determining whether or not a conflict exists between them comprises computing a conflict index value that indicates whether or not there is a conflict between the first and second proposed alterations.

12. The method of claim 11, wherein computing the conflict index value comprises computing an overlap index value based upon an overlap of the first and second proposed alterations and determining whether the overlap index value exceeds a previously determined overhead threshold value.

13. The method of claim 11, wherein computing the conflict index value comprises computing a similarity index value based upon a similarity of the first and second proposed alterations and determining whether the similarity index value exceeds a previously determined similarity threshold value.

14. The method of claim 10, wherein the proposed alterations are either additions, deletions or modifications.

15. The method of claim 10, wherein the processing of the request includes providing a visual presentation of a proposal to a user, the proposal comprising an application of either the first proposed alteration or the second proposed alteration to the information stored in the database, such that the user is capable of deciding whether or not to implement the proposal.

16. The method of claim 15, further comprising including in the proposal user information, feedback data, or interaction data pertaining to the first or second alteration request.

17. The method of claim 10, further comprising:
    comparing previously determined first and second validation index values for the first and second alteration requests, respectively; and
    proposing that the alteration request having the higher corresponding validation index value be implemented.

18. The method of claim 10, further comprising:
receiving a third alteration request that specifies a third proposed alteration;
analyzing the third alteration request; and
determining whether a conflict exists between the first and second alteration requests, the first and third alteration requests, or the second and third alteration requests, wherein the conflict comprises an inconsistency among the corresponding proposed alterations.

19. The method of claim 10, further comprising implementing the request and causing information in the database to be altered as specified by the request.

20. A computer program product tangibly embodied in a computer readable medium, the computer program product including instructions that, when executed, perform a method to analyze multiple different requests to alter an electronic knowledge repository and generate a proposed modification to the electronic knowledge repository, the method comprising:

receiving first and second alteration requests, the first and second alteration requests originating from first and second users, respectively, and specifying first and second proposed alterations, respectively, to information stored in the electronic knowledge repository;

assigning to each of the first and second alteration requests a validity index value that represents the desirability of the corresponding proposed alteration, each assigned validity index value being determined using data pertaining to the particular user from which the alteration request originated;

analyzing the first and second alteration requests by computing a degree of inconsistency between the first and second proposed alterations, and determining if the degree of consistency exceeds a specified threshold;

if the degree of inconsistency exceeds the specified threshold, generating a proposed knowledge repository modification request that includes only one of the first and second proposed alterations, the only one alteration being determined using the validity indexes associated with each of the first and second alteration requests; and forwarding the generated proposed modification request for further processing that determines if and how the knowledge repository is to be changed.

* * * * *